(12) United States Patent
Michaud et al.

(10) Patent No.: US 10,043,419 B1
(45) Date of Patent: Aug. 7, 2018

(54) DISABLED TAG HANDLING SYSTEM

(71) Applicants: Guy Michaud, Spring Hill, FL (US);
 Arthur Michaud, Lake Alfred, FL (US)

(72) Inventors: Guy Michaud, Spring Hill, FL (US);
 Arthur Michaud, Lake Alfred, FL (US)

( * ) Notice: Subject to any disclaimer, the term of this patent is extended or adjusted under 35 U.S.C. 154(b) by 0 days.

(21) Appl. No.: 15/045,976

(22) Filed: Feb. 17, 2016

(51) Int. Cl.
 *G09F 3/08* (2006.01)
 *G09F 21/04* (2006.01)
 *B60J 3/02* (2006.01)
 *B60R 13/00* (2006.01)

(52) U.S. Cl.
 CPC .............. *G09F 3/08* (2013.01); *B60J 3/0278* (2013.01); *B60R 13/005* (2013.01); *G09F 21/04* (2013.01)

(58) Field of Classification Search
 CPC .......... G09F 3/08; G09F 21/04; B60J 3/0278; B60R 13/005
 See application file for complete search history.

(56) References Cited

U.S. PATENT DOCUMENTS

| | | | |
|---|---|---|---|
| 6,276,081 B1 * | 8/2001 | Shedd | G09F 21/04 116/28 R |
| 8,128,125 B1 * | 3/2012 | Ngan | B42D 1/007 281/15.1 |
| 2011/0067278 A1 * | 3/2011 | Hulbert | B60J 3/0204 40/593 |

* cited by examiner

*Primary Examiner* — D Glenn Dayoan
*Assistant Examiner* — Melissa A Black

(57) ABSTRACT

A tag support assembly has a rectangular coupling section, a rectangular pivoting section, a pivot pin, and inverted L-shaped fingers. The coupling section is releasably coupled to a vehicle visor. The pivoting section has corner tabs. An opening is created for removable receipt of a disabled tag. The pivoting section removably receives the disabled tag. The pivot pin extends through the coupling section and the pivoting section facilitating pivoting of the pivoting section between a raised inoperative orientation and a lowered operative orientation 90 degrees from the raised inoperative orientation for allowing display of the disabled tag.

2 Claims, 2 Drawing Sheets

DISABLED TAG HANDLING SYSTEM

BACKGROUND OF THE INVENTION

Field of the Invention

The present invention relates to a disabled tag handling system and more particularly pertains to removably receiving a disabled tag, pivoting the received disabled tag between a raised inoperative orientation and a lowered operative orientation, and displaying the disabled tag while in the lowered operative orientation, the removable receiving, the pivoting and the displaying being done in a safe, convenient, and economical manner.

SUMMARY OF THE INVENTION

In view of the foregoing disadvantages inherent in the known types of tag handling systems of known designs and configurations now present in the prior art, the present invention provides an improved disabled tag handling system. As such, the general purpose of the present invention, which will be described subsequently in greater detail, is to provide a new and improved disabled tag handling system and method which has all the advantages of the prior art and none of the disadvantages.

From a broad view point, the present invention is a disabled tag handling system. A tag support assembly is provided. The tag support assembly includes a coupling section, a pivoting section, and a pivot pin. The coupling section is rectangular in configuration. The coupling section has inverted L-shaped fingers. In this manner, the coupling section is releasably coupled to a vehicle visor. The pivoting section is rectangular in configuration. The pivoting section has corner tabs. In this manner an opening is created for removable receipt of a disabled tag. The pivoting section removably receives the disabled tag. The pivot pin extends through the coupling section and the pivoting section. In this manner pivoting the pivoting section between a raised inoperative orientation and a lowered operative orientation is facilitated. The operative orientation is 90 degrees from the raised inoperative orientation. In this manner, the disabled tag is allowed to be displayed.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved disabled tag handling system which has all of the advantages of the prior art tag handling systems of known designs and configurations and none of the disadvantages.

It is another object of the present invention to provide a new and improved disabled tag handling system which may be easily and efficiently manufactured and marketed.

It is a further object of the present invention to provide a new and improved disabled tag handling system which is of durable and reliable constructions.

An even further object of the present invention is to provide a new and improved disabled tag handling system which is susceptible of a low cost manufacture with regard to both materials and labor, and which accordingly is then susceptible of low prices of sale to the consuming public, thereby making such disabled tag handling system economically available to the buying public.

Lastly, another object of the present invention is to provide a disabled tag handling system for removably receiving a disabled tag, for pivoting the received disabled tag between a raised inoperative orientation and a lowered operative orientation, and for displaying the disabled tag while in the lowered operative orientation, the removable receiving, the pivoting and the displaying being done in a safe, convenient, and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same
parts throughout the various Figures.

DESCRIPTION OF THE PREFERRED EMBODIMENT

Figure 1:
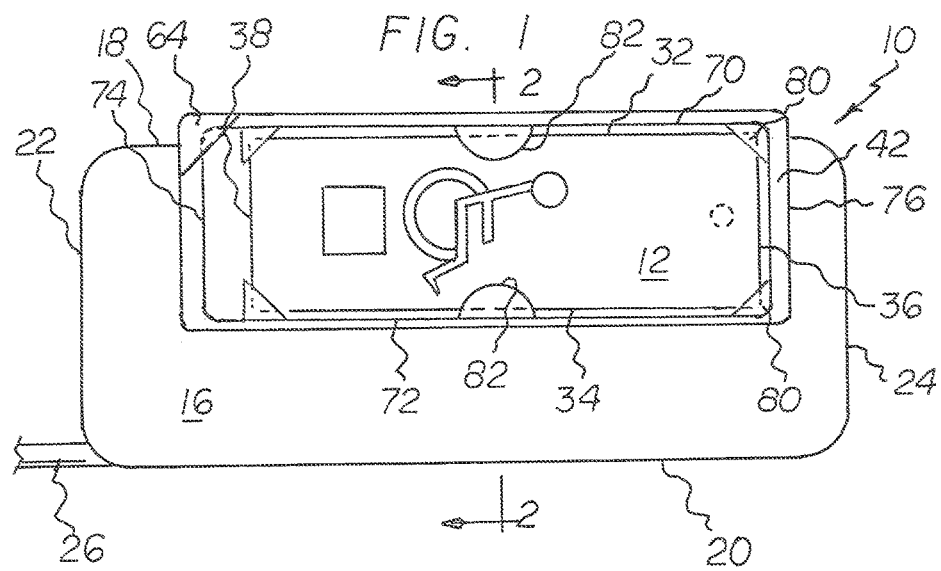
FIG. 1 is a front elevational view of a disabled tag handling system constructed in accordance with the principles of the present invention.
Figure 2:
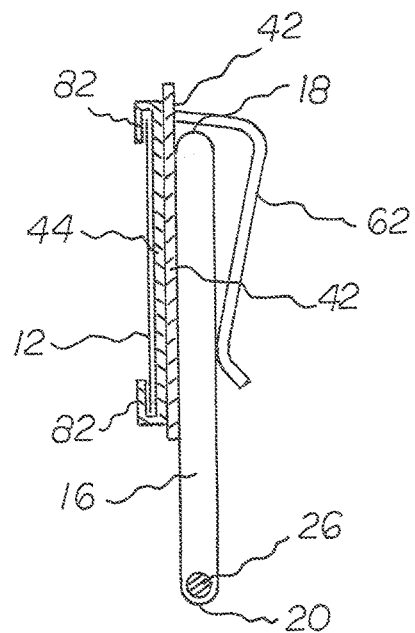
FIG. 2 is a cross sectional view of the system taken along line 2-2 of FIG. 1.
Figure 3:
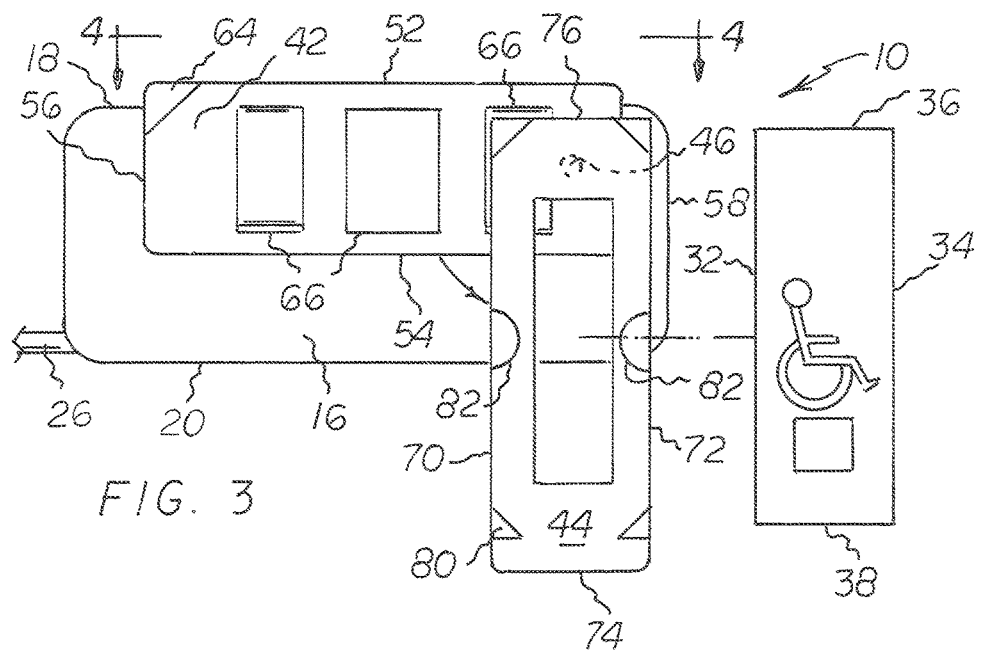
FIG. 3 is a front elevational view of the system similar to FIG. 1 but with the pivoting section in a lowered operative orientation for being displayed.
Figure 4:
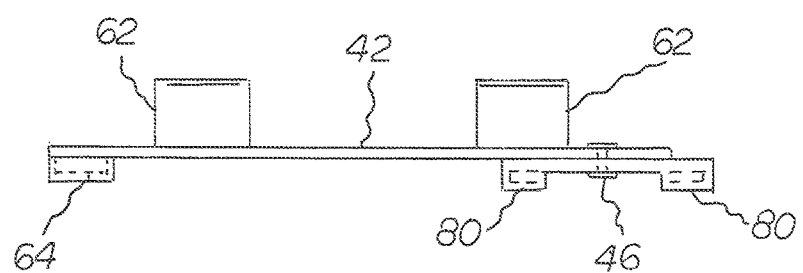
FIG. 4 is a plan view of the system taken along line 4-4 of FIG. 3.

With reference now to the drawings, and in particular to FIG. 1 thereof, the preferred embodiment of the new and improved disabled tag handling system embodying the principles and concepts of the present invention and generally designated by the reference numeral 10 will be described.

The present invention, the disabled tag handling system 10 is comprised of a plurality of components. Such components in their broadest context include a coupling section, a pivoting section, and a pivot pin. Such components are individually configured and correlated with respect to each other so as to attain the desired objective.

From a specific viewpoint, the present invention is a disabled tag handling system. First provided is a vehicle visor 16. The vehicle visor is rectangular in configuration. The vehicle visor has an upper edge 18 and a lower edge 20. The upper edge and the lower edge are separated by a height. The vehicle visor has a left side edge 22 and a right side edge 24. The left side edge and the right side edge are separated by a width. The width is between 35 percent and 45 percent of the height. A rotation rod 26 is provided. The rotation rod is supported along the lower edge. In this manner pivotable movement of the visor between a raised inoperative position and a lowered operative position is allowed.

A disabled tag 12 is provided. The disabled tag has a left side edge 32 and a right side edge 34. The left side edge and the right side edge are separated by a width. The disabled tag has an upper edge 36 and a lower edge 38. The upper edge and the lower edge are separated by a height. The disabled tag has a front surface. Indicia is provided on the front surface.

A disabled tag support assembly 42 is provided. The disabled tag support assembly includes a coupling section 42. The disabled tag support system also includes a pivoting section 44. The disabled tag support system further includes a pivot pin 46.

The coupling section 42 is rectangular in configuration. The coupling section has an upper edge 52 and a lower edge 54. The upper edge and the lower edge are separated by a height. The coupling section has a left side edge 56 and a right side edge 58. The left side edge and the right side edge are separate by a width. The width is between 35 percent and 45 percent of the height. The coupling section has a rear surface. The coupling section has two resilient inverted L-shaped fingers 62. The two resilient inverted L-shaped fingers extend rearwardly from the rear surface adjacent to the upper edge. The two resilient inverted L-shaped fingers further extend around the upper edge of the visor. In this manner the coupling section of the visor is removably coupled. The coupling section has a front surface. The coupling section has a triangular retainer 64. The triangular retainer is adjacent to the upper edge and the left side edge. The support section has a plurality of rectangular cut-outs 66 to reduce the weight the of the support section.

The pivoting section 44 is rectangular in configuration. The pivoting section has an upper edge 70 and a lower edge 72. The upper edge and the lower edge are separated by a height. The pivoting section has a left side edge 74 and a right side edge 76. The left side edge and the right side edge are separated by a width. The width is between 35 percent and 45 percent of the height. The coupling section has a front surface. The front surface has four triangular corner tabs 80. The front surface also has two semi-circular edge tabs 82. In this manner the disabled tag is releasably received. The vehicle visor, the disabled tag, the coupling section, and the pivoting section each have a periphery. The periphery of the disabled tag is less than the periphery of the pivoting section. The periphery of the pivoting section is less than the periphery of the supporting section. The periphery of the supporting section is less than the periphery of the vehicle visor.

Further provided is a pivot pin 46. The pivot pin extends through the coupling section and the pivoting section to facilitate pivoting the pivoting section between the raised inoperative orientation and a lowered operative orientation 90 degrees from the inoperative orientation for display of the disabled tag. The pivot pin holds the pivoting section and the disabled tag. The indicia face away from coupling section. The pivot pin is adjacent to the side edges of the support and pivoting sections. The pivot pin is midway between the upper and lower sections of the support and pivoting sections. The pivoting section, when in the raised inoperative orientation, is closer to the right side edge of the coupling section than to the left side edge of the coupling section to provide a portion of the pivoting section to be received in the triangular retainer.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, material shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A tag handling system comprising:
    a tag support assembly including a coupling section and pivoting section and a pivot pin;
    the coupling section having a rectangular configuration with inverted L-shaped fingers for releasably coupling to a vehicle visor;
    the pivoting section having a rectangular configuration and provided with corner tabs creating an opening for removable receipt of a disabled tag, the pivoting section removably receiving the disabled tag;
    the pivot pin extending through the coupling section and the pivoting section to facilitate pivoting the pivoting section between a raised inoperative orientation and a lowered operative orientation 90 degrees from the raised inoperative orientation for allowing the disabled tag to be displayed; and
    a retainer on the coupling section adjacent to the top edge and the left side edge, the pivot pin being located adjacent to the right side edges of the support and pivoting sections, the pivot pin being midway between the upper and lower sections of the support and pivoting sections, the pivoting section when in the raised inoperative orientation being closer to the right side edge of the coupling section than to the left side edge of the coupling section to thereby provide a portion of the pivoting section to be received in the retainer;
    the vehicle visor and the disabled tag and the coupling section and the pivoting section each having a periphery with the periphery of the disabled tag being less than the periphery of the pivoting section, and with the periphery of the pivoting section being less than the periphery of the supporting section, and with the periphery of the supporting section being less than the periphery of the vehicle visor.

2. A disabled tag handling system (10) for removably receiving a disabled tag (12), for pivoting the received disabled tag between a raised inoperative orientation and a lowered operative orientation, and for displaying the disabled tag while in the lowered operative orientation, the removable receiving, the pivoting and the displaying being done in a safe, convenient, and economical manner, the system comprising, in combination:

a vehicle visor (16) having a rectangular configuration with an upper edge (18) and a lower edge (20) separated by a height and with a left side edge (22) and a right side edge (24) separated by a width, the width being between 35 percent and 45 percent of the height, a rotation rod (26) supporting the visor along the lower edge for pivotable movement of the visor between a raised inoperative position to a lowered operative position;

the disabled tag (12) having a left side edge (32) and a right side edge (34) separated by a width, the disabled tag having an upper edge (36) and a lower (38) separated by a height, the disabled tag having a front surface with indicia thereon;

a disabled tag support assembly (42) including a coupling section (42) and a pivoting section (44) and a pivot pin (46);

the coupling section (42) having a rectangular configuration with an upper edge (52) and a lower edge (54) separated by a height and with a left side edge (56) and a right side edge (58) separated by a width, the width being between 35 percent and 45 percent of the height, the coupling section having a rear surface with two resilient inverted L-shaped fingers (62) extending rearwardly from the rear surface adjacent to the upper edge and extending around the upper edge of the visor to releasably couple the coupling section of the visor, the coupling section having a front surface and a triangular retainer (64), the triangular retainer being adjacent to the upper edge and the left side edge, the support section having a plurality of rectangular cut-outs (66) for weight reduction purposes;

the pivoting section (44) having a rectangular configuration with an upper edge (70) and a lower edge (72) separated by a height and with a left side edge (74) and a right side edge (76) separated by a width, the width being between 35 percent and 45 percent of the height, the coupling section having a front surface with four triangular corner tabs (80) and two semi-circular circular edge tabs (82) to releasably receive the disabled tag, the vehicle visor and the disabled tag and the coupling section and the pivoting section each having a periphery with the periphery of the disabled tag being less than the periphery of the pivoting section, and with the periphery of the pivoting section being less than the periphery of the supporting section, and with the periphery of the supporting section being less than the periphery of the vehicle visor; and a pivot pin (46) extending through the coupling section and the pivoting section to facilitate pivoting the pivoting section between the raised inoperative orientation and a lowered operative orientation 90 degrees from the inoperative orientation for being displayed, the pivot pin holding pivoting section and the disabled tag with the indicia facing away from the coupling section, the pivot pin being located adjacent to the right side edges of the support and pivoting sections, the pivot pin being midway between the upper and lower sections of the support and pivoting sections, the pivoting section when in the raised inoperative orientation being closer to the right side edge of the coupling section than to the left side edge of the coupling section to thereby provide a portion of the pivoting section to be received in the triangular retainer.

\* \* \* \* \*